(12) United States Patent
Urquhart

(10) Patent No.: US 8,789,641 B1
(45) Date of Patent: Jul. 29, 2014

(54) SUSPENSION FOR A SCOOTER

(71) Applicant: Paul Jeffery Urquhart, Kent, WA (US)

(72) Inventor: Paul Jeffery Urquhart, Kent, WA (US)

( * ) Notice: Subject to any disclaimer, the term of this patent is extended or adjusted under 35 U.S.C. 154(b) by 0 days.

(21) Appl. No.: 13/933,737

(22) Filed: Jul. 2, 2013

Related U.S. Application Data

(60) Provisional application No. 61/667,208, filed on Jul. 2, 2012.

(51) Int. Cl.
  *B62K 11/02* (2006.01)
(52) U.S. Cl.
  CPC ..................................... *B62K 11/02* (2013.01)
  USPC ......................................... 180/227; 180/228
(58) Field of Classification Search
  USPC ......................................... 280/124; 180/227
  See application file for complete search history.

(56) References Cited

U.S. PATENT DOCUMENTS

2007/0007065 A1* 1/2007 Iizuka et al. ................... 180/227
2008/0129009 A1* 6/2008 Czysz ............................ 280/275

* cited by examiner

*Primary Examiner* — Joseph M Rocca
*Assistant Examiner* — Gabriela C Craciun
(74) *Attorney, Agent, or Firm* — Plager Schack LLP

(57) ABSTRACT

A scooter is configured to rapidly dissipate impact loading permitting jumps and safe landings without damaging the scooter. The scooter includes a frame attached to a fork that is further attached to handle bars and a front wheel such that the handle bars can turn the front wheel allowing the scooter to turn. The frame is attached to a swing arm with a suspension system and a rotation bolt such that the suspension system causes the swing arm to rotate about the rotation bolt to rapidly dissipate impact loading. A rear wheel is mechanically coupled to the swing arm that cushions the jumps permits the safe landings without damaging the scooter.

4 Claims, 4 Drawing Sheets

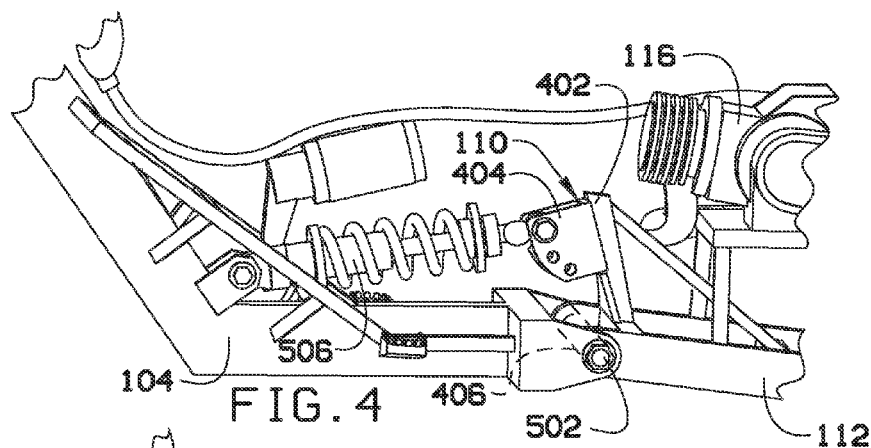
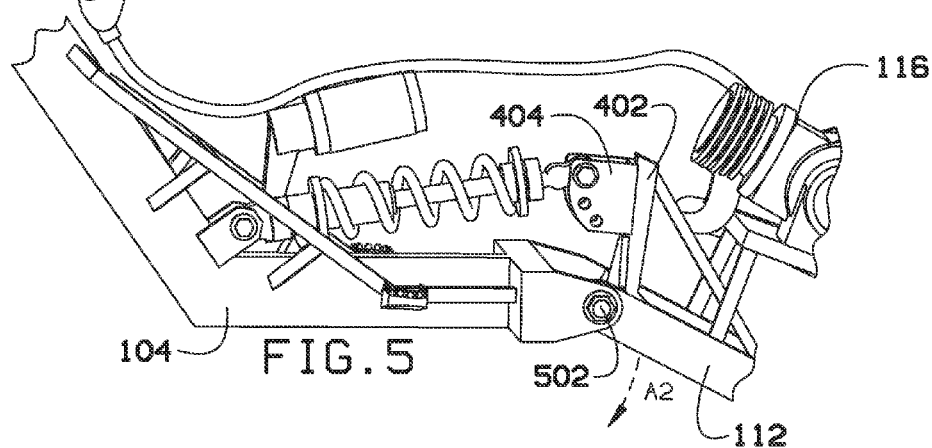
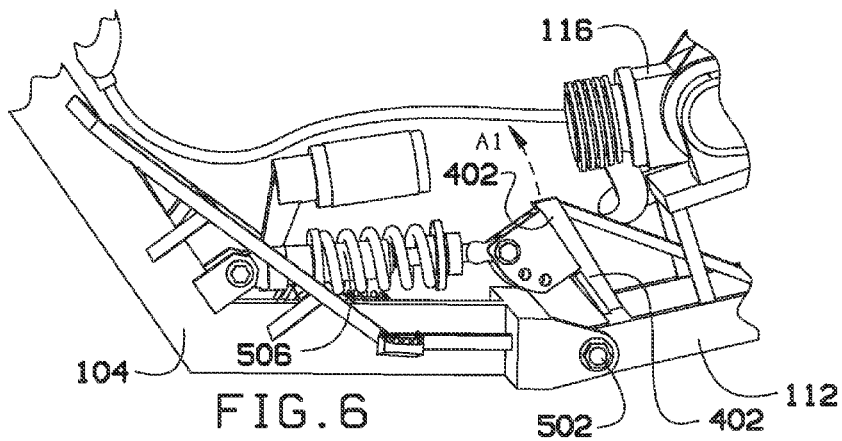

US 8,789,641 B1

SUSPENSION FOR A SCOOTER

RELATED APPLICATION

This application claims priority to provisional patent application U.S. Ser. No. 61/667,208 filed on Jul. 2, 2012, the entire contents of which is herein incorporated by reference.

BACKGROUND

The embodiments herein relate generally to small motorized vehicles that accommodate a rider.

Prior to the disclosed inventions, the lack of a usable suspension on scooters severely restricted their use. Small bumps could cause an accident due to small wheels and poor suspension in prior art scooters. The prior art solution is Cantilevered Independent Dynamic Linkless Indespension (CIDLI). CIDLI involves a series of rubber rods that are heavily compressed and absorb some shock from bumps, however if a user wants to go off jumps exceeding several feet, something more is needed. Embodiments of the present invention solve this problem.

SUMMARY

A scooter is configured to rapidly dissipate impact loading permitting jumps and safe landings without damaging the scooter. The scooter includes a frame attached to a fork that is further attached to handle bars and a front wheel such that the handle bars can turn the front wheel allowing the scooter to turn. The frame is attached to a swing arm with a suspension system and a rotation bolt such that the suspension system causes the swing arm to rotate about the rotation bolt to rapidly dissipate impact loading. A rear wheel is mechanically coupled to the swing arm that cushions the jumps permits the safe landings without damaging the scooter.

In some embodiments, the frame further comprises a head tube. An upper triple clamp is mechanically coupled to the head tube and further mechanically coupled to a left shock and a right shock. A lower triple clamp is mechanically coupled to the head tube and permits passage of the left shock and the right shock. The left shock and the right shock are mechanically coupled to the front wheel to enable castor in turning allowing the scooter to make sharper turns.

In some embodiments, a motor is mechanically coupled to a chain wherein the motor can turn the chain. A sprocket is mechanically coupled to the chain wherein the motor can turn the sprocket via the chain. In this manner, the rear wheel is mechanically coupled to the sprocket making the scooter a motorized scooter.

In some embodiments, the frame further comprises a down bar attached to a bottom bar at an angle A. The angle A is greater than 90 degrees to distribute weight forward on the scooter.

BRIEF DESCRIPTION OF THE FIGURES

The detailed description of some embodiments of the invention is made below with reference to the accompanying figures, wherein like numerals represent corresponding parts of the figures.

FIG. 4 is a detail perspective view of the invention.

FIG. 5 is a detail perspective view of the invention demonstrating A2 force.

FIG. 6 is a detail perspective view of the invention demonstrating A1 force.

DETAILED DESCRIPTION OF CERTAIN EMBODIMENTS

Figure 1:
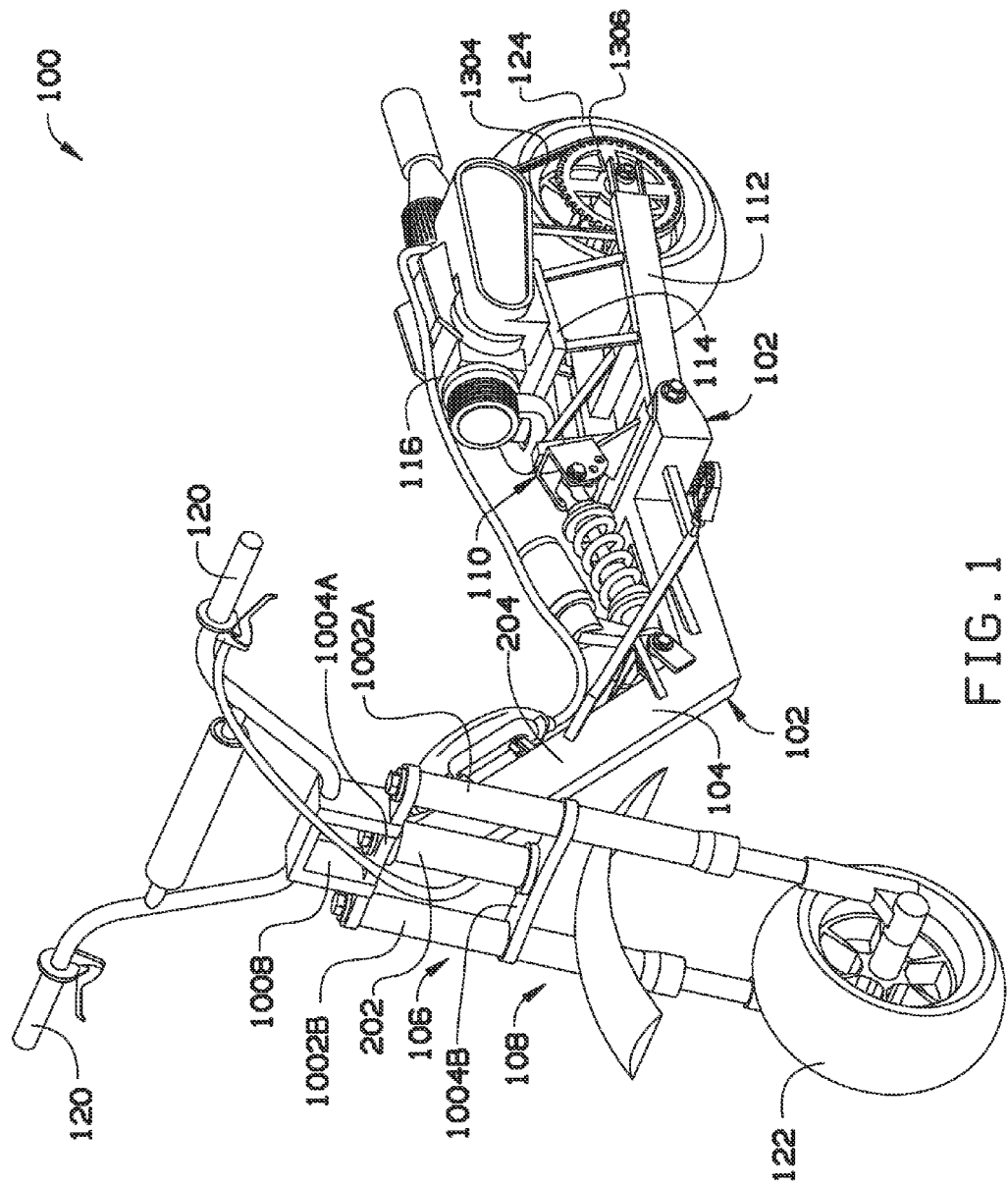
FIG. 1 is a forward perspective view of the invention.

By way of example, and referring to FIG. 1, scooter 100 comprises suspension system 102 mechanically coupled to frame 104. Frame 104 comprises head tube 202 which is mechanically coupled to fork 106. Fork 106 is mechanically coupled to front suspension 108. Frame 104 is further mechanically coupled to rear suspension 110 which is shown in more detail in FIG. 4, FIG. 5 and FIG. 6. Frame 104 and rear suspension 110 are further mechanically coupled to swing arm 112. Swing arm 112 is rotationally coupled to motor mount 114. Motor mount 114 is further mechanically coupled to motor 116.

Head tube 202 is mechanically coupled to upper triple clamp 1004A with a first bolt and lower triple clamp 1004B with a second bolt. Front shock 108 comprises upper triple clamp 1004A mechanically coupled to left shock 1002A with a left bolt and right shock 1002B with a right bolt. Both left shock 1002A and right shock 1002B pass through holes in lower triple clamp 1004B, but are not mechanically coupled to lower triple clamp 1004B. Left shock 1002A and right shock 1002B are mechanically coupled to front disc 123 which is further mechanically coupled to front wheel 122. This enables castor in turning allowing scooter 100 to make sharper turns.

Upper triple clamp 1004A is mechanically coupled to handle bar risers 1008. Handle bar rises 1008 are further mechanically coupled to handle bars 120.

Figure 2:
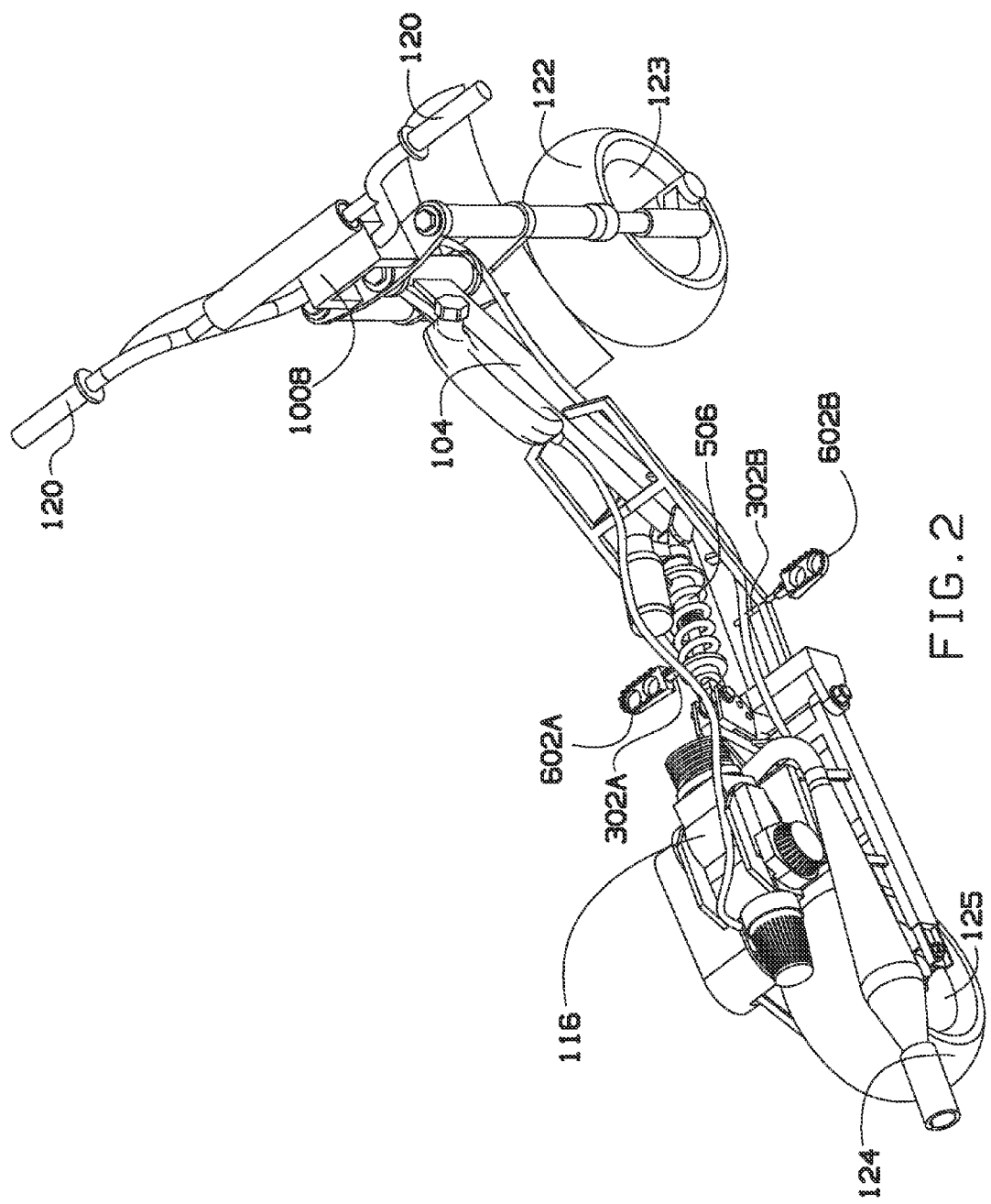
FIG. 2 is a rear perspective view of the invention.

In some embodiments scooter 100 is a motorized scooter. Swing arm 112 is attached to sprocket 1306. Sprocket 1306 can turn rear disc 125, which is shown in FIG. 2. Rear disc 125 is mechanically coupled to rear wheel 124. Sprocket 1306 is connected to motor 116 by chain 1304. In some embodiments chain 1304 is a belt. Regardless, chain 1304 is used by motor 116 to turn rear wheel 124 and thus propel scooter 100.

Turning to FIG. 2, frame 104 is mechanically coupled to left foot peg mount 302A and right foot peg mount 302B. Left foot peg mount 302A is further mechanically coupled to left foot peg 602A. Likewise right foot peg mount 302B is further mechanically coupled to right foot peg 602B.

Figure 3:
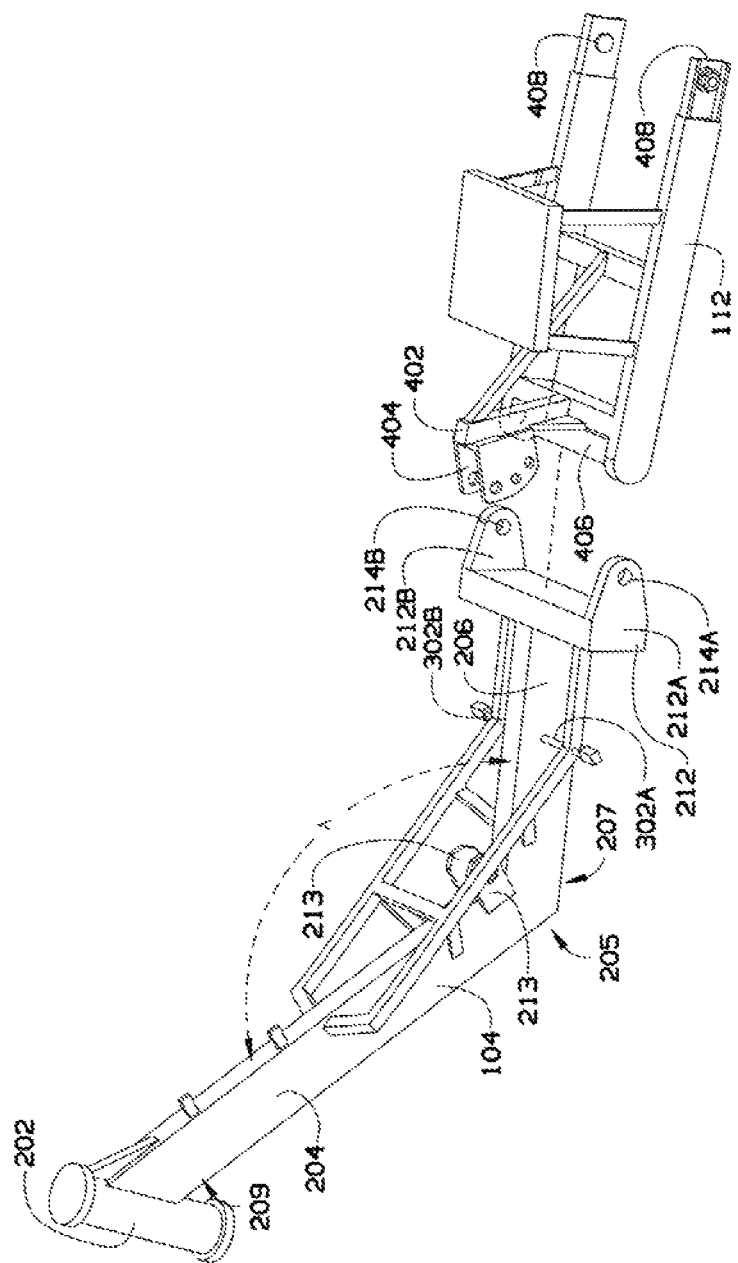
FIG. 3 is an exploded view of the invention frame related items only.

FIG. 3 shows frame 104 and swing arm 112 in more detail. Frame 104 comprises head tube 202 mechanically coupled to a down bar front end 209 on down bar 204. A down bar rear end 205 on down bar 204 is mechanically coupled to a bottom bar front end 207 on bottom bar 206. Down bar rear end 205 is mechanically coupled to forward rear shock mount 213 which can be used to mount rear shock 506 as shown in FIG. 4, FIG. 5 and FIG. 6. A bottom bar rear end is mechanically coupled to mounting bracket 212. Down bar 204 and bottom bar 206 are connected at an angle A. In some embodiments, A is greater than 90 degrees in order to encourage a user to put one's weight forward.

Mounting bracket 212 is used to connect frame 104 to swing arm 112. Mounting bracket 212 comprises left bracket 212A perforated by left bracket hole 214A. Mounting bracket 212 further comprises right bracket 212B perforated by right bracket hole 214B. A user can connect cross tube 406 on frame 104 to swing arm 112 on by inserting rotation bolt 502 through left bracket hole 214A into cross tube 406 and finally through right bracket hole 214B as shown in FIG. 4, FIG. 5 and FIG. 6.

Swing arm 112 is mechanically coupled to swing bar 402. Swing bar 402 is mechanically coupled to aft rear shock mount 404. In this embodiment there are three possible settings to mount rear shock 506 created by spaced holes, but there can be any number depending on user preference. Swing arm 112 is further mechanically coupled to rear wheel mount 408 which can be used to mount rear wheel disc 125.

FIG. 4, FIG. 5 and FIG. 6 show how rear suspension 110 works. When Force A1 rotates swing arm 112 clockwise about rotation bolt 502, then rear shock 506 compresses to absorb the impact created by Force A1 as shown in FIG. 6. When Force A2 rotates swing arm 112 counter clockwise about rotation bolt 502, then rear shock 506 expands to absorb the impact created by Force A2 as shown in FIG. 5. As with other shock absorbers, rear shock 506, dissipates the energy of either Force A1 or Force A2 and eventually reaches steady state which is shown in FIG. 4. Unlike the prior art, the configuration of rear shock 506 allows a user to make jumps and safe landings without damaging the suspension or scooter 100.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

The invention claimed is:

1. A scooter configured to rapidly dissipate impact loading permitting jumps and safe landings without damaging the scooter, the scooter comprising,
  a frame mechanically attached to a fork that is further mechanically attached to handle bars and a front wheel wherein the handle bars can turn the front wheel allowing the scooter to turn;
  wherein the frame further comprises a head tube mechanically attached to a down bar; a forward rear shock mount is attached to the down bar and configured to accommodate a rear shock;
  the frame is mechanically attached to a swing arm with a rear suspension and a rotation bolt wherein the rear suspension causes the swing arm to rotate about the rotation bolt to rapidly dissipate impact loading;
  a swing bar, mechanically attached to the swing arm; an aft rear shock mount, attached to the swing bar; wherein the aft rear shock mount is configured to receive the rear shock in at least three positions;
  a rear wheel mechanically attached to the swing arm such that the rear shock cushions the jumps permits the safe landings without damaging the scooter; and
  a motor mechanically attached to the swing arm and configured to provide both weight and mechanical energy to the rear wheel.

2. The scooter of claim 1,
an upper triple clamp is mechanically coupled to the head tube and further mechanically coupled to a left shock and a right shock,
a lower triple clamp is mechanically coupled to the head tube and permits passage of the left shock and the right shock;
the left shock and the right shock are mechanically coupled to the front wheel to enable caster in turning allowing the scooter to make sharper turns.

3. The scooter of claim 1,
the motor is mechanically coupled to a chain wherein the motor can turn the chain;
a sprocket mechanically coupled to the chain wherein the motor can turn the sprocket via the chain;
wherein the rear wheel is mechanically coupled to the sprocket.

4. The scooter of claim 1,
the frame further comprises a down bar mechanically coupled to a bottom bar at an angle A wherein the angle A is greater than 90 degrees to distribute weight forward on the scooter.

\* \* \* \* \*